J. Bull,
Scissors,
N° 85,427. Patented Dec. 29, 1868.

Witnesses:

Inventor:
J. Bull

JAMES BULL, OF GALESBURG, ILLINOIS.

Letters Patent No. 85,427, dated December 29, 1868; antedated December 19, 1868.

IMPROVEMENT IN SCISSORS.

The Schedule referred to in these Letters Patent and making part of the same.

*To all whom it may concern:*

Be it known that I, JAMES BULL, of Galesburg, in the county of Knox, and in the State of Illinois, have invented certain new and useful Improvements in Sewing-Machine Scissors; and do hereby declare that the following is a full, clear, and exact description thereof, reference being had to the accompanying drawings, and to the letters of reference marked thereon.

The nature of my invention consists in the construction of a pair of scissors, with curved blades, and handles consisting of springs secured together at the end, so that the scissors are easily picked up from the table when desired to be used; and they are designed for any use that a pair of straight scissors can be put to, but more especially to cut off the threads on sewing-machines.

In order to enable others skilled in the art to make and use my invention, I will proceed to describe its construction and operation, referring to the annexed drawings, forming part of this specification, and in which—

Figure 1:
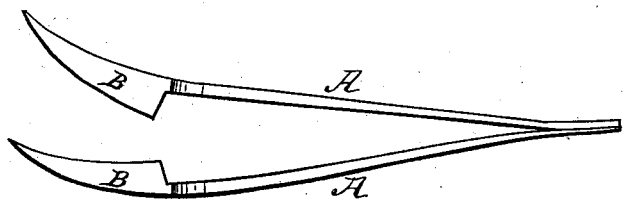

Figure 1 is a side view, and

Figure 2:
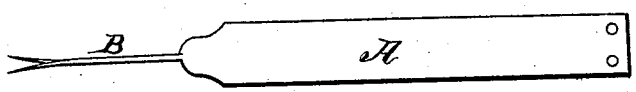

Figure 2, a plan view.

A A represent two flat steel springs, fastened together in one end with rivets, as shown in fig. 2, and forming in their other end the curved blades B B, which are sharpened, one on its concave and the other on its convex edge, so as to form a pair of scissors.

By this arrangement of the springs A A as handles, the common bows and rivets are done away with, which were always more or less liable to get out of order; and the curved blades serve to draw out the thread from under a sewing-machine, and cutting it off at the same time, instead of, as before, having to use both hands in taking the thread out, holding it, and then cutting it off. These scissors are, also, easily picked up from the table, in whatever position they may be found.

Having thus fully described my invention,

What I claim as new, and desire to secure by Letters Patent, is—

The combination of the curved blades A A with the spring-handles B B, substantially as and for the purposes herein set forth.

In testimony that I claim the foregoing, I have hereunto set my hand, this 15th day of May, 1868.

JAMES BULL.

Witnesses:
C. M. ALEXANDER,
LEOPOLD EVERT.